May 8, 1951   J. C. WILLIAMS ET AL   2,552,077
COUPLING FOR FLEXIBLE PIPES
Filed Dec. 3, 1947
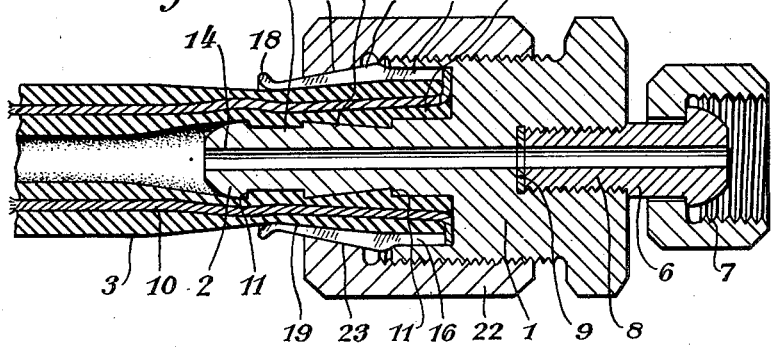
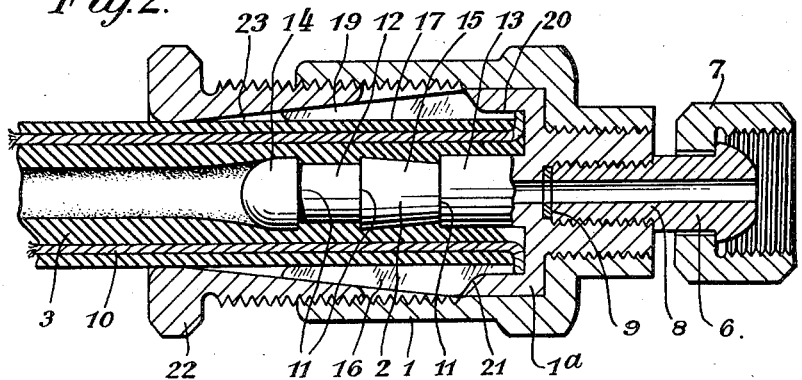
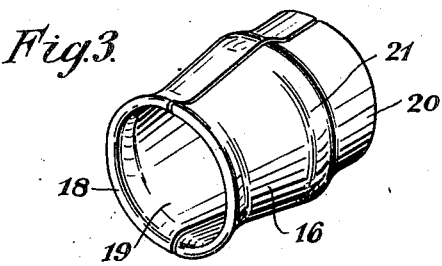
INVENTORS:
JOHN CHARLES WILLIAMS
& IVOR SCOT WINBY, DEC'D
BY HENRY ARCHIBALD KEMLO
& JAMES LEONARD TOMPSON, EX'RS
BY
ATTORNEY Patented May 8, 1951

2,552,077

UNITED STATES PATENT OFFICE 2,552,077

COUPLING FOR FLEXIBLE PIPES

John Charles Williams, Slough, and Ivor Scot Winby, deceased, late of Cookham Dean, near Maidenhead, England, by Henry Archibald Kemlo, London, and James Leonard Thompson, Laleham-on-Thames, England, executors, assignors to High-Pressure Components Limited, London, England, a British company Application December 3, 1947, Serial No. 789,446
In Great Britain February 17, 1943

4 Claims. (Cl. 285—86)

This invention relates to pipe couplings for pipes composed of rubber or other relatively soft flexible material which incorporate a protective layer of woven wire or other armouring material embedded in the walls of the pipe, the invention being applicable to cases wherein it is required to connect together two such flexible pipes in end-to-end relationship, or a single pipe to a liquid or other container or fitting with which the pipe is to be associated.

Flexible pipes incorporating a layer of armouring material are commonly employed on aircraft in connection with hydraulic oxygen and air-line equipment, and it is essential in the design of such couplings that absolute fluid-tightness shall be obtained, and that there shall be no tendency for the pipe to creep relative to its associated coupling member due to end load.

It has hitherto been proposed to cut away the rubber or other flexible material comprising the pipe to bare the amouring material and to flare the latter outwardly, the armouring material being bent back to enable it to be gripped between parts of the coupling. In this prior construction the externally-screwthreaded body portion was formed with a cylindrical protuberance having annular ridges, the body portion having a conical recess for the entry of the flared armouring when the pipe was forced onto the protuberance, the armouring being gripped between a conical metal clamping ring and the face of the conical recess, the ring being urged in an endwise direction to produce the required clamping action by a sleeve nut in threaded engagement with the body, the sleeve nut having a cylindrical extension which surrounded the pipe and was formed with annular ridges, the cylindrical extension being swaged at its extremity to grip the pipe and compress it onto the protuberance on the body with the object of making a leak-proof joint therewith. The present invention makes use of the idea of clamping the outwardly-flared end of the armouring between two cooperating parts of the coupling.

A desirable feature of such pipe couplings is that they should be easily dismantled and remade under difficult conditions, e. g. in the case of an aircraft during flight, and that there should be little or any tendency for the pipe to rotate with the sleeve nut when tightening the latter as any such tendency is liable to disarrange the outwardly-flared end of the armouring and prevent it being gripped between the cooperating parts, and the chief object of the invention is to evolve a coupling having such desirable features.

A pipe coupling of the kind set forth and in accordance with the invention comprises an externally or internally screwthreaded body member having a protuberance onto which the end of the pipe is adapted to be forced by hand, subsequent to the rubber or other flexible material comprising the pipe being removed to expose the armouring, and the exposed end of the armouring being flared outwardly, a contractible pipe-clamping collar surrounding that part of the pipe in contact with the protuberance, the pipe-clamping collar having a tapered or part-conical outer surface, and a sleeve nut adapted to engage the screwthreads on the body and engage the tapering or part-conical surface of the pipe-clamping collar either direct or by way of an internally-tapered collar within the nut so as to result in axial movement of the pipe-clamping collar to cause the outwardly-flared end of the armouring to be gripped between the end of the pipe-clamping collar and body member, and the pipe-clamping collar to be contracted to compress the pipe between the inner surface thereof and the protuberance on the body member.

The use of an externally-tapered pipe collar which was split longitudinally has already been proposed in a pipe coupling for use with a pipe which did not incorporate armouring material, but in this prior arrangement the collar was split at a number of points over a part only of its length and consequently was not contractible as a whole into clamping engagement with the pipe, that part of the collar which was split being caused to grip the pipe under the action of a surrounding sleeve nut which was internally tapered to engage the tapering periphery of the collar, the sleeve nut being in screwthreaded engagment with the body so that the action of tightening up the sleeve nut caused the latter to ride up the tapering collar and contract it to compress the pipe onto annular ridges which were formed on a cylindrical protuberance on the body, the protuberance entering the end of the pipe.

In order that the said invention may be clearly understood and readily carried into effect the same will now be more fully described with reference to the accompanying drawing, in which—

Figure 1 is a longitudinal section of a coupling constructed in accordance with the invention for use in connection with armoured flexible pipes.

Figure 2 is a longitudinal section of a modified construction.

Figure 3 is a perspective view of the two part clamping collar as used in Figure 1.

In the construction illustrated by Figures 1 and 3 the coupling member consists of an externally screw threaded body 1 having a projecting protuberance or spigot 2 adapted to receive the end of the pipe 3, the protuberance being formed integrally with the body. In the construction illustrated the body 1 carries a further spigot 6 which in turn carries a sleeve nut 7 for the attachment of the coupling to a container or for attachment to a metal pipe, the spigot 6 being formed with a screw threaded extension 8 which enters an internally screw threaded boring in the body, a washer 9 being provided to ensure a fluid tight connection.

The flexible pipe 3 is composed of rubber or other relatively soft flexible material and incorporates a woven wire or other armouring 10.

In order to assist in preventing the flexible pipe 3 creeping off the protuberance 2 under end load and to prevent seepage of the fluid between the pipe and surface of the protuberance, the latter is formed with a number of spaced annular ridges 11 of a diameter slightly in excess of the internal diameter of the pipe. For example the protuberance may be formed with two parallel sided annular surfaces 12 and 13 of unequal diameter, the larger diameter surface 13 lying adjacent the body, the other annular surface 12 terminating in a part spherical ball end 14 of larger diameter. The two annular surfaces 12 and 13 are spaced apart by an intervening tapering or part conical surface 15, the latter tapering towards the body, the direction of taper assisting in maintaining the pipe in position, the ball end annular surface adjacent the body and the tapering surface of the larger end being all preferably of the same diameter.

The pipe clamping collar 16 which is shown removed in Figure 2 is of annular form and is preferably split longitudinally into halves to permit of its effective diameter being reduced to exert radial pressure on the flexible pipe. Alternatively the clamping collar may be built up of more than two segmental shaped parts or may be slit throughout a part of its length at one or more points to give the collar sufficient flexibility to enable to be forced firmly into contact with the outer surface of the pipe. As a further alternative it may be formed from strip material helically wound.

In the arrangement illustrated, the collar is coned externally as at 17 and is flared outwardly at its extremity as at 18 to receive the pipe, the collar being internally coned as at 19. The end of the collar opposite to the flared part 18 is of parallel sided cylindrical form as at 20, an annular protuberance or shoulder 21 being formed where the conical surface 17 joins the cylindrical part 20, which annular protuberance occupies the position shown when the sleeve nut 22 is fully tightened.

The sleeve nut is formed with an internal part conical surface 23 which engages the part conical surface 17 of the clamping collar, the arrangement being such that upon the sleeve nut being tightened to draw it further on to the body 1, the conical surface 23 rides up the part 17 and thus reduces the effective diameter of the clamping collar until the two parts thereof abut.

By removing a portion of the rubber at the end of the pipe prior to its application to the spigot 2, the metal armouring will be exposed, the metal armouring being flared outwardly sufficiently to enable it to be clamped between the end of the clamping collar and the body, the action of tightening up the sleeve nut 22 on the body causing the clamping collar to be moved endwise and the projecting armouring material to be clamped firmly between the extremity of the clamping collar and the adjacent surface of the body. In this way the armouring material is firmly anchored to the body and will withstand a high end load, whilst, due to the fact that the armouring material makes a metal to metal contact with the body, the armouring material is electrically bonded thereto.

As an alternative to the sleeve nut making direct contact with the clamping collar, a ring-like intermediate collar or washer may be interposed between the parts for the purpose of still further decreasing any possibility of the clamping collar turning when the sleeve nut is rotated and facilitating rotation of the latter.

In operation the sleeve nut 22 is first placed in position on the pipe either before or subsequent to the rubber being cut back to expose the armouring material and the armouring material being splayed outwardly, the pipe being then forced on to the projecting spigot or protuberance into a position in which it abuts against the body. The two-part clamping collar is then applied to the exterior of the pipe and the sleeve nut moved lengthwise along the pipe into a position in which it can be engaged with the screw threads on the body, the sleeve nut being then tightened up until its internal conical surface engages the part conical surface on the clamping collar, thus causing the latter not only to be reduced in effective diameter but to be moved endwise towards the body into a position in which the projecting armouring material will be clamped between the extremities of the clamping collar and the adjacent surface of the body, in which position the two halves of the clamping collar will abut or substantially abut at their edges.

It will be appreciated that by flaring the extremity of the clamping collar outwardly as at 18 that the rubber pipe is not likely to be damaged under the radial pressure exerted by the clamping collar.

The construction of pipe coupling illustrated by Figure 2 is similar to that illustrated by Figure 1, the same reference numerals being therefore employed, but in this case the sleeve nut is externally screw threaded to engage corresponding screw threads in the body portion, the latter being recessed to receive the sleeve nut. The operation of the coupling member is otherwise substantially as in Figure 1.

The body portion in this case is formed in two parts 1 and 1a arranged one within the other, the two parts being in screw threaded engagement. In Figure 2 the sleeve nut 22 is shown not fully tightened whilst in this arrangement the edge of the clamping collar is not flared outwardly.

We claim:

1. A coupling for rubber pipes having a protective layer of metal armoring embedded in the walls comprising a screw threaded body having a protuberance for entry into the end of the pipe after the rubber has been removed to expose the end of the armoring and the exposed armoring flared outwardly, a contractible pipe-clamping collet comprising a plurality of separable segment shaped parts surrounding that part of the pipe which encloses the protuberance, said collet being externally tapered throughout the major part of its length and terminating in a cylindrical skirt portion at one end thereof and a flared portion at the other end thereof, said body being formed with an annular recess for the entry of said cylindrical skirt portion when assembling said segments in position around the pipe, and a sleeve nut in screw threaded connection with said body and being internally tapered to engage the external tapering part of said collet to move same radially inwardly into gripping engagement with said pipe and axially to grip the armoring between the end edge of said collet and the opposed wall of said annular recess formed in said body.

2. A coupling for rubber pipes having a protective layer of metal armoring which extends beyond the end of the rubber comprising an externally screw threaded body having an axial protuberance at one end for entry into the end of the pipe, a contractible pipe-clamping collet comprising a plurality of segment shaped parts surrounding that part of the pipe which encloses the protuberance, said collet being externally and internally tapered throughout the major part of its length and terminating in a cylindrical skirt portion at one end thereof having a radial end edge and a flared portion at the other end thereof, said body being formed with an annular recess opening at said one end thereof for receiving the end of the pipe and the projecting end of the armoring after the latter has been flared outwardly and for the entry of said collet skirt portion, when assembling the segments of said collet in position on the pipe, and an internally threaded sleeve nut for screw threaded connection with said body and having an internally tapered portion to engage the external tapering parts of said collet segments to move said segments radially inwardly into gripping engagement with said pipe and axially to grip the projecting end of the armoring between the end edges of the said collet segments and the bottom of the annular recess in said body.

3. A coupling according to claim 1 wherein said protuberance is provided with annular ridges of a diameter in excess of the internal diameter of the pipe to which it is applied and a tapering portion intermediate said annular ridges, the said intermediate portion tapering towards said body.

4. A coupling according to claim 2 wherein said protuberance is provided with annular ridges of a diameter in excess of the internal diameter of the pipe to which it is applied and a tapering portion intermediate said annular ridges, the said intermediate portion tapering towards said body.

JOHN CHARLES WILLIAMS.

HENRY ARCHIBALD KEMLO,
JAMES LEONARD THOMPSON,
*Executors of the Estate of Ivor Scot Winby, Deceased.*

REFERENCES CITED

The following references are of record in the file of this patent:

UNITED STATES PATENTS

| Number | Name | Date |
|---|---|---|
| 177,686 | Buzzell | May 23, 1876 |
| 1,863,870 | Moore | June 21, 1932 |
| 2,333,612 | Zimmer | Nov. 2, 1943 |
| 2,394,632 | Parker | Feb. 12, 1946 |

FOREIGN PATENTS

| Number | Country | Date |
|---|---|---|
| 224,144 | Great Britain | Nov. 6, 1924 |